(12) United States Patent
Verbil

(10) Patent No.: US 6,754,583 B2
(45) Date of Patent: Jun. 22, 2004

(54) SERVER-ASSISTED POSITION DETERMINATION IN A RADIO NETWORK

(75) Inventor: Christopher J. Verbil, Los Altos, CA (US)

(73) Assignee: Qualcomm, Incorporated, San Diego, CA (US)

(*) Notice: Subject to any disclaimer, the term of this patent is extended or adjusted under 35 U.S.C. 154(b) by 116 days.

(21) Appl. No.: 10/094,316

(22) Filed: Mar. 8, 2002

(65) Prior Publication Data
US 2002/0173909 A1 Nov. 21, 2002

Related U.S. Application Data (60) Provisional application No. 60/274,494, filed on Mar. 9, 2001.

(51) Int. Cl.[7] .............................................. G01C 21/36
(52) U.S. Cl. ..................... 701/213; 701/200; 73/178 R; 340/995; 342/46
(58) Field of Search .............................. 701/213, 200, 701/207, 208, 211, 24; 73/178 R; 340/988, 989, 990, 991, 992, 993, 995; 342/46

(56) References Cited

U.S. PATENT DOCUMENTS

| | | | |
|---|---|---|---|
| 4,758,959 A | * | 7/1988 | Thoone et al. ............... 701/221 |
| 6,321,158 B1 | * | 11/2001 | DeLorme et al. ............ 701/201 |
| 6,353,743 B1 | * | 3/2002 | Karmel ..................... 455/456.5 |
| 6,577,953 B1 | * | 6/2003 | Swope et al. ................ 701/221 |
| 6,587,441 B1 | * | 7/2003 | Urban et al. ................. 370/310 |
| 6,594,580 B1 | * | 7/2003 | Tada et al. ................... 701/211 |

FOREIGN PATENT DOCUMENTS

| | | | |
|---|---|---|---|
| DE | 19640068 | 4/1998 | ........... G01C/21/20 |
| DE | 29811445 | 11/1998 | ............ H04B/1/38 |
| DE | 19816435 | 6/1999 | ........... G01C/21/00 |
| DE | 29911439 | 12/1999 | ............ H04B/1/38 |

* cited by examiner

*Primary Examiner*—William A. Cuchlinski, Jr.
*Assistant Examiner*—Olga Hernandez
(74) *Attorney, Agent, or Firm*—Philip Wadsworth; Charles D. Brown; Richard Bachand (57) ABSTRACT

A client unit (102) has a client GPS receiver (104) integrated with a two-way-radio transceiver (108) and a client manager (116) for performing server-assisted global position fixes. A server unit (120) is associated with a second two-way-radio transceiver (126) and a server manager (130). The client and server managers (116 and 130) function as communication managers, and each has modules for detecting RF channel traffic, enabling transmitter portions of the transceivers (108 and 126) to transmit satellite data and position information only when there is no traffic on the RF channel.

22 Claims, 4 Drawing Sheets

SERVER-ASSISTED POSITION DETERMINATION IN A RADIO NETWORK

RELATED APPLICATIONS

This application claims priority to pending Provisional application No. 60/274,494, filed on Mar. 9, 2001, incorporated herein by reference.

FIELD OF THE INVENTION

The present invention relates generally to position determination and, in particular, concerns to server-assisted position determination technology in a radio network.

BACKGROUND OF THE INVENTION

Global Positioning System (GPS) receivers normally determine their position by computing relative times of arrival of signals transmitted simultaneously from a multiplicity of GPS (or NAVSTAR) satellites. These satellites transmit, as part of their message, both satellite positioning data as well as data on clock timing, so-called "ephemeris" data. The process of searching for and acquiring GPS signals, reading the ephemeris data for a multiplicity of satellites and computing the location of the receiver from this data is time consuming, often requiring several minutes. In many cases, this lengthy processing time is unacceptable and, furthermore, greatly limits battery life in microminiaturized portable applications.

Another limitation of current GPS receivers is that successful operation is limited to situations in which multiple satellites are clearly in view, without obstructions, and where a good quality antenna is properly positioned to receive such signals. As such, they normally are unusable in portable, body-mounted applications, in areas where there is significant foliage or building blockage (e.g., urban canyons), and in in-building applications.

One known solution to this problem involves the use of a cellular telephone, integrated with a GPS receiver. A cellular link is established between the mobile GPS unit, or client, and a second, stationary, GPS receiver, which is associated with a second cellular unit and a computer processor, or server. The mobile GPS receiver takes what is referred to as a snapshot of the available satellite signals. That is to say, the mobile GPS receiver records a short duration of signals from as many satellites as are available in its line of sight. As described above, these signals are likely to be attenuated and fragmented, due to the location of the mobile GPS receiver, which may be in close proximity to buildings or foliage, etc.

According to one known method, described in U.S. Pat. No. 6,131,067, these fragmented signals are digitized, and transmitted, via a cellular link, from the client to the second GPS receiver and server. The second GPS receiver, meanwhile, is recording signals from GPS satellites within line of sight of its own antenna, which is a stationary mounted antenna, situated in a location where it receives unobstructed transmissions from the available satellites. The server associated with the second GPS receiver is then tasked with comparing the signals of the two receivers. By analyzing the fragmented signals from the mobile GPS receiver to the complete signals received by the second GPS receiver, the server can essentially "fill in the blanks" and complete the signals as received at the mobile GPS receiver. The server can then take those reconstructed signals and, using known methods, accurately determine the location of the mobile GPS receiver.

The amount of assistance afforded by the second GPS receiver or base station, can vary significantly. It may be as little as transmitting stored information regarding specific satellites, up to performing the matching process and signal analysis as previously described. In all cases however, the server-assisted location technology requires the use of a cellular link, or some other dedicated transmission medium such that a two-way communication link is continuously established between the client and server.

In other circumstances, a cellular telephone network is not available and radio communication is provided between parties. As those skilled in the art can appreciate, radio communication is intermittent with a single transmitter transmitting at a selected frequency and any receiver tuned to the selected frequency being capable of detecting the transmitted signals. When the transmitter completes transmitting, the selected frequency is available for use by any other transmitter. Thus, a particular frequency or channel is available for use by any transmitter. The server-assisted location technology described above cannot be implemented in a conventional two-way radio because radio communication, does not permit a dedicated two-way communication link. Therefore, it can be appreciated that there is a significant need for server-assisted location technology in a two-way radio system. The present invention provides this, and other advantages, as will be apparent from the following detailed description and accompanying figures.

SUMMARY OF THE INVENTION

A server-assisted position detection device comprises a client global positioning system (GPS) receiver circuit to receive satellite positioning signal data from GPS satellites. The satellite position data received by the client GPS receiver is insufficient to independently establish the location of the client GPS receiver. The client further includes a transmitter to transmit satellite data. A client carrier detection module is used to detect radio traffic on a selected radio frequency (RF) channel. A client transmit enable module enables the client transmitter when no radio traffic is detected on the RF channel.

A server receiver receives data from the client transmitter. A server coupled to the server receiver is configured to analyze the satellite data received by the server receiver. The server uses the received satellite data and additional satellite data to generate location information regarding the location of the client GPS receiver.

The location information may be used remotely or returned to the client unit. To return the location information to the client unit, the system may further comprise a client receiver to receive the location information and a server transmitter to transmit the location information to the client receiver. The server unit further comprises a server carrier detection module to detect radio traffic on an RF channel and a server transmit enable module to enable the server transmitter when no radio traffic is detected on the RF channel to thereby transmit the location information to the client receiver. In alternative embodiments, the client may further comprise a client user interface for displaying the location information. The client user interface may further comprise representation of a local map to indicate the location information.

DETAILED DESCRIPTION OF THE PREFERRED EMBODIMENTS

This invention concerns the method and apparatus for establishing a global position using a client two-way radio. For the sake of convenience, the invention is described in the form of a client-server architecture where the term "client" refers to a portion of the system integrated into or associated with a two-way radio and for which accurate location information is desired. The term "server" refers to a portion of the system associated with a server two-way radio and which provides data by which the location of the client may be accurately determined.

Two-way radio frequency communication, in general, has developed an informal protocol to manage traffic on any given radio frequency (RF) channel. The term "channel" as used herein refers to any radio frequency. Some portions of the RF spectrum are allocated into channels having predetermined frequencies. However, the principles of the present invention are not limited to portions of the spectrum having predetermined frequencies. Thus, channel simply refers to any frequency selected by the user.

A user, wishing to broadcast on a given channel, first listens to a receiver tuned to that channel, to detect the existence of other communication traffic on the channel. In the absence of other traffic on the channel, the user presses a button, sometimes referred to as a push-to-talk (PTT) button, which activates a transmitter on the same frequency, and speaks into the microphone. The user releases the button to cease transmitting and listens for a response on the channel. A second user, wishing to respond, follows the same procedure before responding, first listening for other traffic on the channel, then pressing the PTT button, and speaking into a microphone in response. In regions where radio traffic is heavy, it is not uncommon for two or three conversations to proceed more or less simultaneously. In such an event, user A might wish to converse with user B, while user C wishes to converse with user D. User A might ask a question of user B, but before user B responds, user C might address user D. According to the accepted protocol, user B must wait until there is a break in the traffic on the channel before responding to the question of user A. Failure to follow this informal protocol may result in two users (e.g., user B and user C) transmitting at the same time. The resultant interference may make it impossible for any users to communicate on that channel.

When a mobile device, such as a cellular telephone, determines its position using a cellular link, or some other dedicated transmission medium, the devices (i.e., the client and the server) can operate as though they are cabled together. That is, the cellular network assigns dedicated channels over which the client and server may communicate without disruption. In other wireless systems, such as a code division multiple access (CDMA) wireless system, each client unit is assigned a unique code such that each client unit effectively has a continuous dedicated communication link with a base station. In contrast, devices operating using two-way radio communication must contend with the fact that the radio frequency channel is neither private nor exclusive.

In the case of a server-assisted GPS positioning system, the informal protocol described above would make it impossible to function according to the methods developed for cellular communication. During the period of time that the server is calculating the accurate position of the client, there is no communication on the link between the client device and the server device. For example, there is a certain time requirement in performing the snapshot, in which the client GPS receiver records available signals from the local satellites. It may also take many seconds, or even minutes, for the server to perform the various steps required in establishing the position of the client. The client device cannot maintain the transmitter in an active state since such activation prevents other users from transmitting on that channel without interference. Furthermore, the client device would be incapable of receiving response data from the server device if the client device were constantly maintained in a transmit mode. Thus, a conventional radio system transmits in only one direction at a time and requires that the transmitting device cease transmission in order to receive. During these breaks in transmission other radio traffic can disrupt the link between the client and the server.

Figure 1:
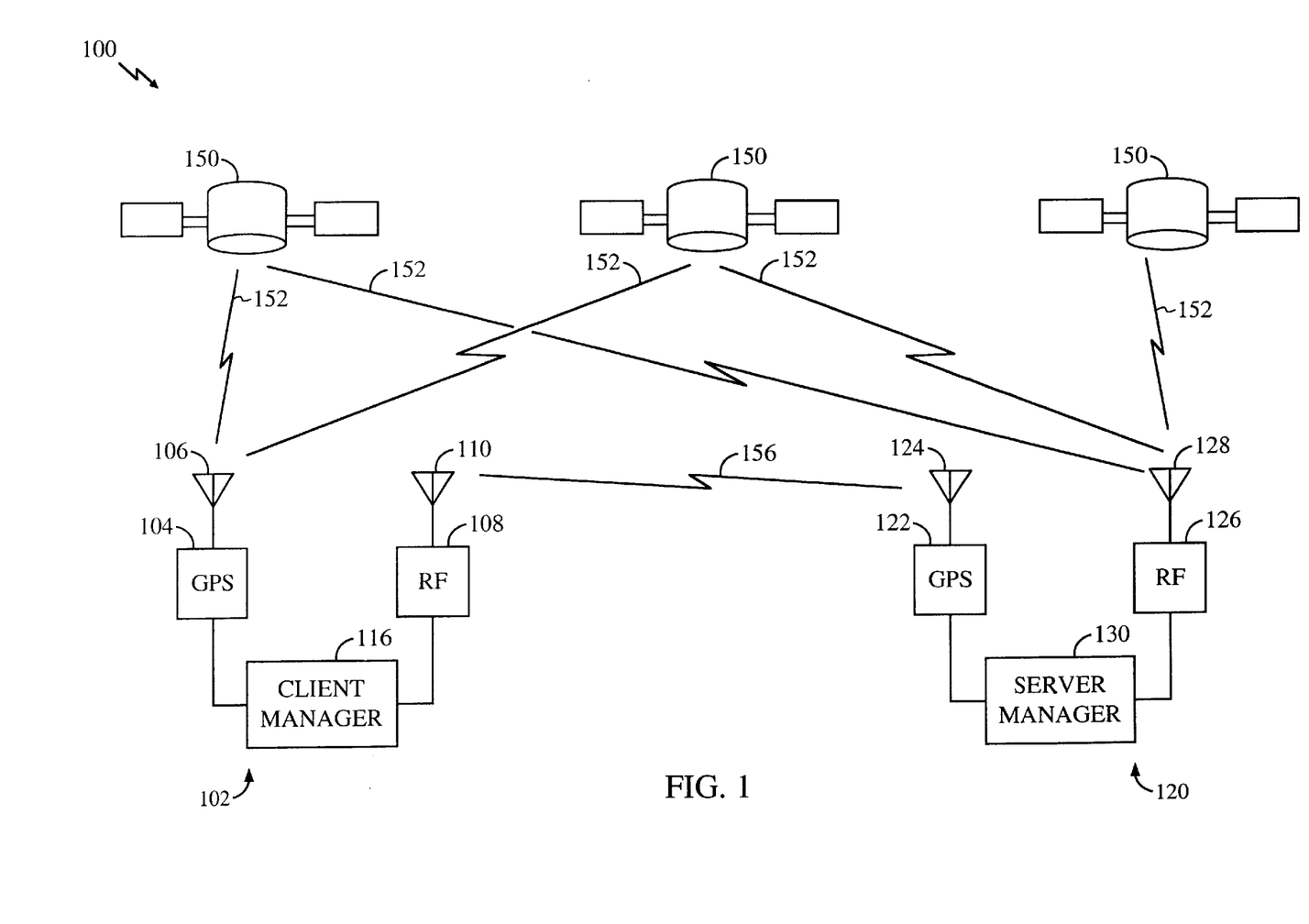
FIG. 1 illustrates a functional block diagram of an exemplary embodiment of the present invention.

FIG. 1 illustrates, in a functional block diagram format, the basic operation of a system 100 constructed according to the principles of the invention. A client unit 102 comprises a GPS receiver 104 coupled to a GPS antenna 106 and a two-way radio transceiver 108 coupled to a radio antenna 110.

The client unit 102 also includes a client manager 116. The term "client manager" is used for convenience only, and is not intended to suggest that all the functions performed as described herein are performed by a single device or component. Rather, according to the principles of the invention, the functions may be performed by a single device or a plurality of devices, incorporating hardware, software or firmware, or a combination thereof.

A server unit 120 comprises a GPS receiver 122 coupled to GPS antenna 124 and a two-way radio transceiver 126 coupled to a radio antenna 128. The server unit 120 also includes a server manager 130. The term "server manager" is also used in a very broad sense to indicate a plurality of functions which are performed by a device, or devices, according to the principles of the invention.

As noted above, the term "client" refers to a portion of the system 100 which cannot independently determine its precise location while the term "server" refers to a portion of the system that receives data from the client and uses the client data in conjunction with independently derived data to precisely determine the location of the client device.

In a typical embodiment, the client unit 102 may be implemented in a mobile two-way radio, such as may be used by a police officer or firefighter. The server unit 120 may be implemented in a base-station, such as a central dispatch center for a police or fire department. However, those skilled in the art can appreciate that the client unit 102 may be in a fixed location while the server unit 120 may be a mobile unit. The present invention simply has one component (i.e., the client unit 102) that is incapable of independently calculating its own location, but which can transmit fragmentary or incomplete location data to a second component (i.e., the server unit 120) to permit the calculation of the client unit location by the server unit.

When the location of the client unit 102 is required, the position is determined in a manner that is similar to that described with respect to the cellular telephone system. That is, the client GPS receiver 104 captures the available GPS satellite transmissions from one or more GPS satellites 150 via a satellite link 152. If the client unit 102 were capable of establishing satellite links 152 with a sufficient number of satellites 150, the client unit could determine its own location using conventional GPS techniques. However, the present invention is intended for operation in circumstances where the client unit 102 cannot establish satellite links 152 with a sufficient number of satellites 150 or cannot establish the satellite links for a sufficient length of time. Instead of a complete set of GPS data, the client unit 102 captures only fragmentary or incomplete GPS data in what may be referred to as a "snapshot" of GPS data. The term "snapshot" is used to refer to the task of seeking the satellite signals, from satellites 150 in line of sight with the GPS receiver 104, and recording fragmentary or incomplete GPS signals that are insufficient to permit location determination.

With the client manager 116 and the server manager 130 managing the two-way-radio interface, the data collected from the snapshot are transmitted via a radio transmission 156 from the client unit 102 to the server unit 120. The server unit 120 compares the data collected by the client unit 102 with data collected simultaneously by the server GPS receiver 122, thereby permitting reconstruction of the fragmentary data as required. The resulting information is analyzed by the server unit 120 to accurately determine the location of the client unit 102.

Figure 2:
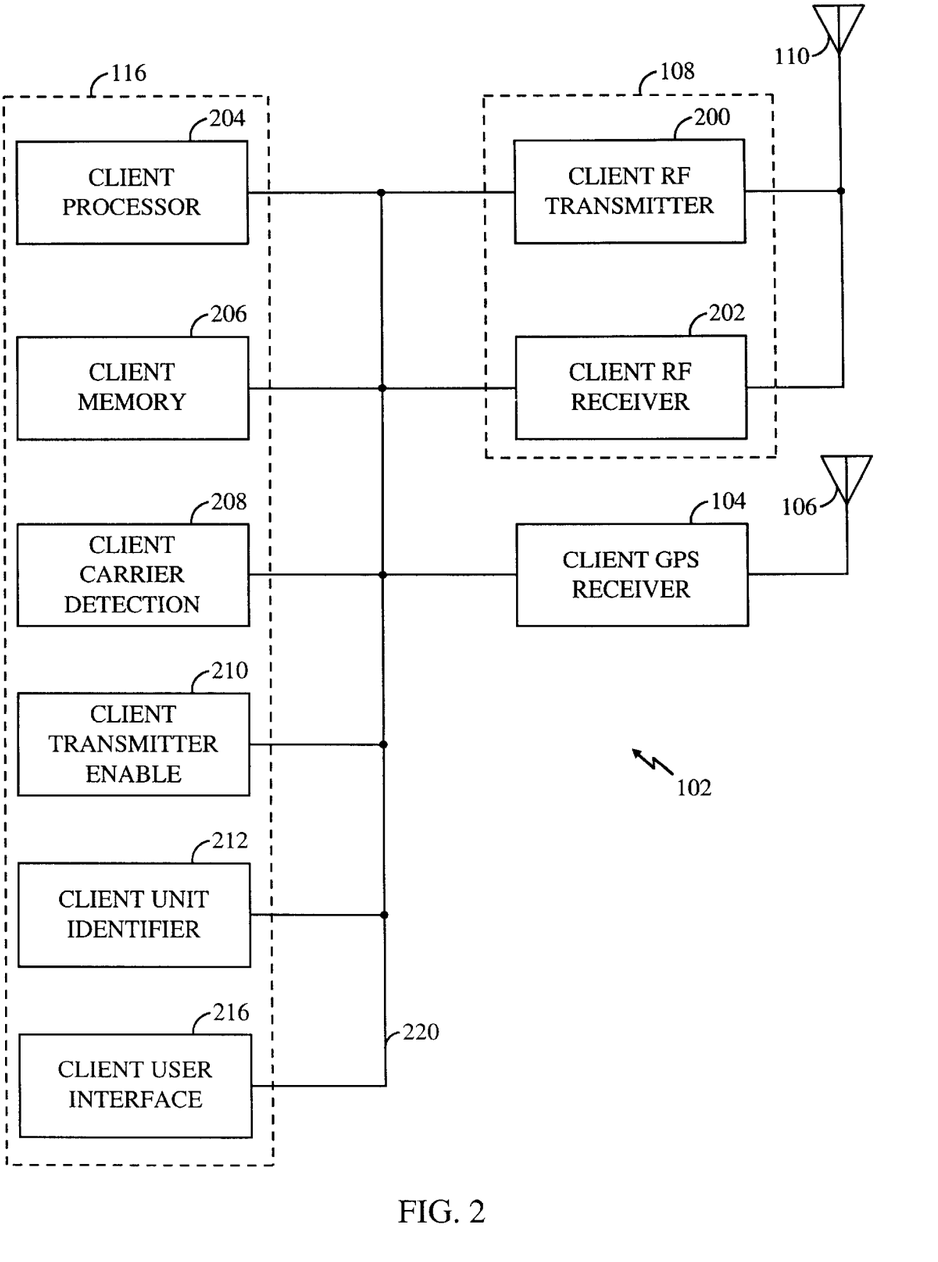
FIG. 2 is a functional block diagram illustrating the components of a client unit of FIG. 1.

The client manager 116 and the server manager 136 control the flow of data between the client unit 102 and the server unit 120. FIG. 2 shows, in greater detail, the functional modules of the client unit 102, while FIG. 3 similarly illustrates the server unit 120.

In one embodiment of the invention, illustrated in FIG. 2, the transceiver 108 is functionally illustrated as a transmitter 200 and receiver 202. In one embodiment, the transceiver 108 may be integrated with the GPS receiver 104 into a single unit. The transceiver 108 may have one antenna 110, and the GPS receiver a second antenna 106, as shown in FIG. 2, or they may share a single antenna (not shown).

Also integrated into the same unit is the client manager 116, having a processor 204 and memory 206. The processor 204 may be implemented by any conventional processing device, such as a microprocessor, microcontroller, application specific integrated circuit, digital signal processor, or the like. The client memory 206 may comprise random access memory (RAM) and read-only memory (ROM) and may also include nonvolatile RAM. The client memory 206 contains instructions and data executed by the CPU 204 to implement many of the functions of the client unit 102. For example, the client memory 206 may be supplied with software or firmware comprising a carrier detection module 208, a transmitter enable module 210, and a unit identifier module 212.

A user interface module 216 configured according to the specific requirements of the application is further included. A typical user interface 216 might comprise a small display with a keypad, in the case of a hand held or body mounted device, or a larger computer screen with keyboard, such as might be used in a vehicle mounted unit. If the client user interface 216 includes a small display, such as a liquid crystal display (LCD), the client user interface can indicate the position of the client unit 102 using, by way of example, latitude and longitude coordinates. If the client user interface 216 includes a computer display, other optional data may be provided to the user. For example, a graphical representation of a map of the local region with means for indicating the position of the client unit 102 in relation to the immediate surroundings is another possible user interface.

The various components described above are coupled together by a bus system 220, which may include a data bus, control bus, address bus, power bus, and the like. However, for the sake of clarity, the various buses are illustrated in FIG. 2 as the bus system 220. A person skilled in the art will recognize that the actual communication links between the various modules will vary according to the configuration, and may be as simple as conductive pathways in an integrated circuit in an implementation where the modules are integrated into a single device, or may be printed circuit board traces, electronic cables, connectors, optical cables or any other medium that will serve to provide reliable communication between the modules of the client unit 102.

Figure 3:
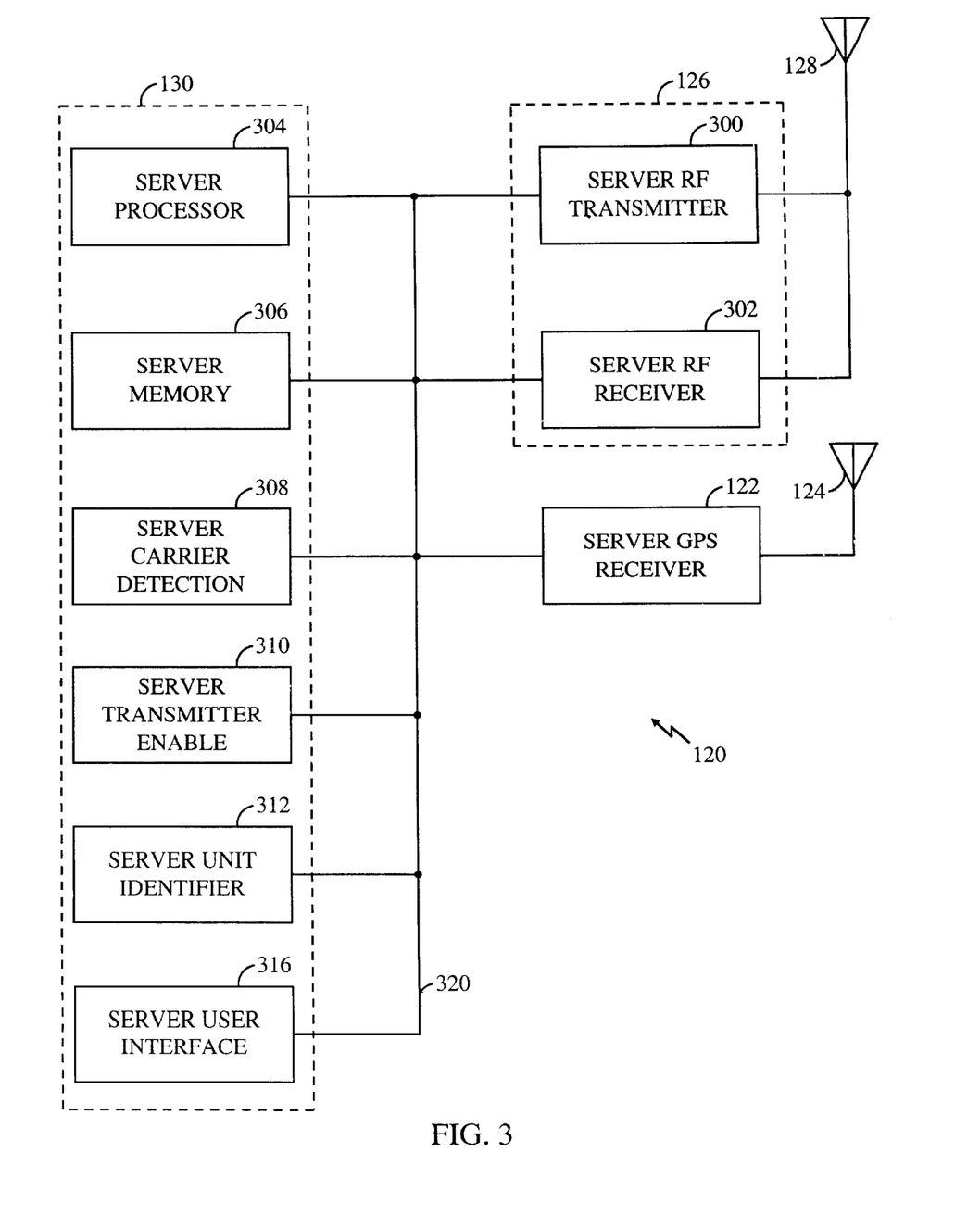
FIG. 3 is a functional block diagram illustrating the components of a base station of FIG. 1.

FIG. 3 shows a typical configuration of a server unit 120. The various components of the base station may or may not be integrated into a single unit. For example, the server unit 120 may be an integrated system in which the server transceiver 126 is integrated with the GPS receiver 122. The server transceiver 126 may have one antenna 128 and the GPS receiver 122 a second antenna 124 (as shown in FIG. 3), or they may share a single antenna (not shown). The server manager 130 may be integrated into the server unit 120 or may be located at some distance from the server transceiver 126 and GPS receiver 122. In yet another alternative embodiment, a remote processor (not shown) may receive the fragmentary data from the client unit 102 via the server transceiver 126 and the complete GPS data from the GPS receiver 122 and perform calculations. The resultant location information may be relayed back to the client unit 102 via the server transceiver 126. However, the calculations described above need not be performed by the server unit 120. The server transceiver 126 is functionally illustrated in FIG. 3 as a RF transmitter 300 and a RF receiver 302.

The server manager 130, performs a similar function as the client manager 116 in the client unit 102 and includes similar components, such as a server processor 304 and server memory 306. The processor 304 may be implemented by any conventional processing device, such as a microprocessor, microcontroller, application specific integrated circuit, digital signal processor, or the like. The client memory 306 may comprise random access memory (RAM) and read-only memory (ROM) and may also include non-volatile RAM. The client memory 306 contains instructions and data executed by the processor to implement many of the functions of the server unit 120. For example, the client memory 306 may be supplied with firmware or software programs comprising a carrier detection module 308, a transmitter enable module 310, and a base identifier module 312.

A user interface module 316 is configured according to the specific requirements of the application. As noted above with respect to the client user interface 216 (see FIG. 2) the server user interface 316, may comprise a display and user input device, such as a keypad or keyboard. For the sake of brevity, those elements are not illustrated in FIG. 3. However, as noted above, the display (not shown) portion of the server user interface 316 may be a simple alphanumeric display to provide data indicating the position of the client unit 102 or may be a computer display to provide additional data, such as a map overlay to indicate the position of the client unit relative to immediate surroundings.

The various components described above are coupled together by a bus system 320, which may include a data bus, control bus, address bus, power bus, and the like. However, for the sake of clarity, the various buses are illustrated in FIG. 3 as the bus system 320. Furthermore, the bus system 320, which is illustrated functionally rather than structurally, may actually be one or more of several types of connections. Inasmuch as the components of the server unit 120 may be physically remote from each other, the connectors will be selected according to the specific requirements, but may include electronic cables, optical cables, network connections, internet links, or other means for establishing the required communication between the components.

With reference to FIGS. 1–3, the operation of the system 100 may now be described. When the location of the client unit 102 is desired, the user initiates the location request at the client user interface 216 (see FIG. 2). In response to the location request, the GPS receiver 104 takes a snapshot, capturing a segment of transmission from as many of the GPS satellites 150 (see FIG. 1) as are in line of sight when the GPS receiver 104 is enabled to perform the capture process. The GPS receiver 104 then digitizes the transmission segments and collects them into data packets, which are passed to the client manager 116.

The unit identifier module 212 generates a unique ID code that identifies the particular client unit 102, and appends the ID code to the data packets, which include the code and the digitized information from the GPS receiver 104. The ID code is particularly useful when many different client units 102 may be operating in a geographic region. For example, the system 100 may be used to track a fleet of taxi cabs in a city. The unique ID code can differentiate between each of the taxi cabs. If only a single client unit 102 is present in the system, then the unique ID code is not necessary.

The carrier detection module 212 (see FIG. 2) detects radio traffic on a radio frequency channel. The carrier detection module 212 uses known techniques, such as monitoring an RF channel for transmitted signals having an energy level above a predetermined threshold. If radio traffic is present on the RF channel, the transmitter enable module 210 prevents activation of the transmitter 200. This avoids RF collision and the resultant interference. In the absence of radio traffic on the RF channel, the transmitter enable module 210 enables the transmitter 200 to transmit one or more data packets to the server unit 120 via the radio transmission 156 (see FIG. 1).

With reference to FIG. 3, the receiver 302 of the server unit 120 receives the transmitted data packets. The server unit identifier 312 recognizes the unique code of the client unit 104 and the server manager 130 accepts the transmission. The server processor 304 extracts the data and performs the location analysis as previously described, and establishes the precise location of the client unit 104. The process of locating the client unit 104 using the snapshot data in conjunction with GPS data from the server GPS receiver 122 is well known in the art and need not be described in detail herein.

The server processor 304 can accurately establish the location of the client unit 104 using data transmitted over the radio transmission 156 (see FIG. 1). The server processor 304 generates location information concerning the client unit 102. The location information is assembled digitally into a location information packet. The server identifier module 312 then generates and attaches the unique code identifying the client unit 102.

The server carrier detection module 308 detects radio traffic on a radio frequency channel. If radio traffic is present on the RF channel, the transmitter enable module 310 prevents activation of the transmitter 300. This avoids RF collision and the resultant interference. In the absence of radio traffic on the RF channel, the transmitter enable module 310 enables the transmitter 300 to transmit location information to the client unit 102 via the radio transmission 156 (see FIG. 1). Thus, the system 100 permits the exchange of information between the client unit 102 and the server unit 120 via the radio transmission 156. At the same time, the system 100 prevents the inadvertent transmission by either the client unit 102 or the server unit 120 that may cause interference by transmitting when other RF traffic is already on the selected RF channel.

Returning again to FIG. 2, the RF receiver 202 of the client unit 102 receives the transmitted location information packet. The client unit identifier module 212 detects the unique ID code, which identifies the location information packet as being pertinent to the client unit 102, and decodes the location information packet, extracting the location information. The location of the client unit 102 is presented at the user interface 216.

Figure 4:
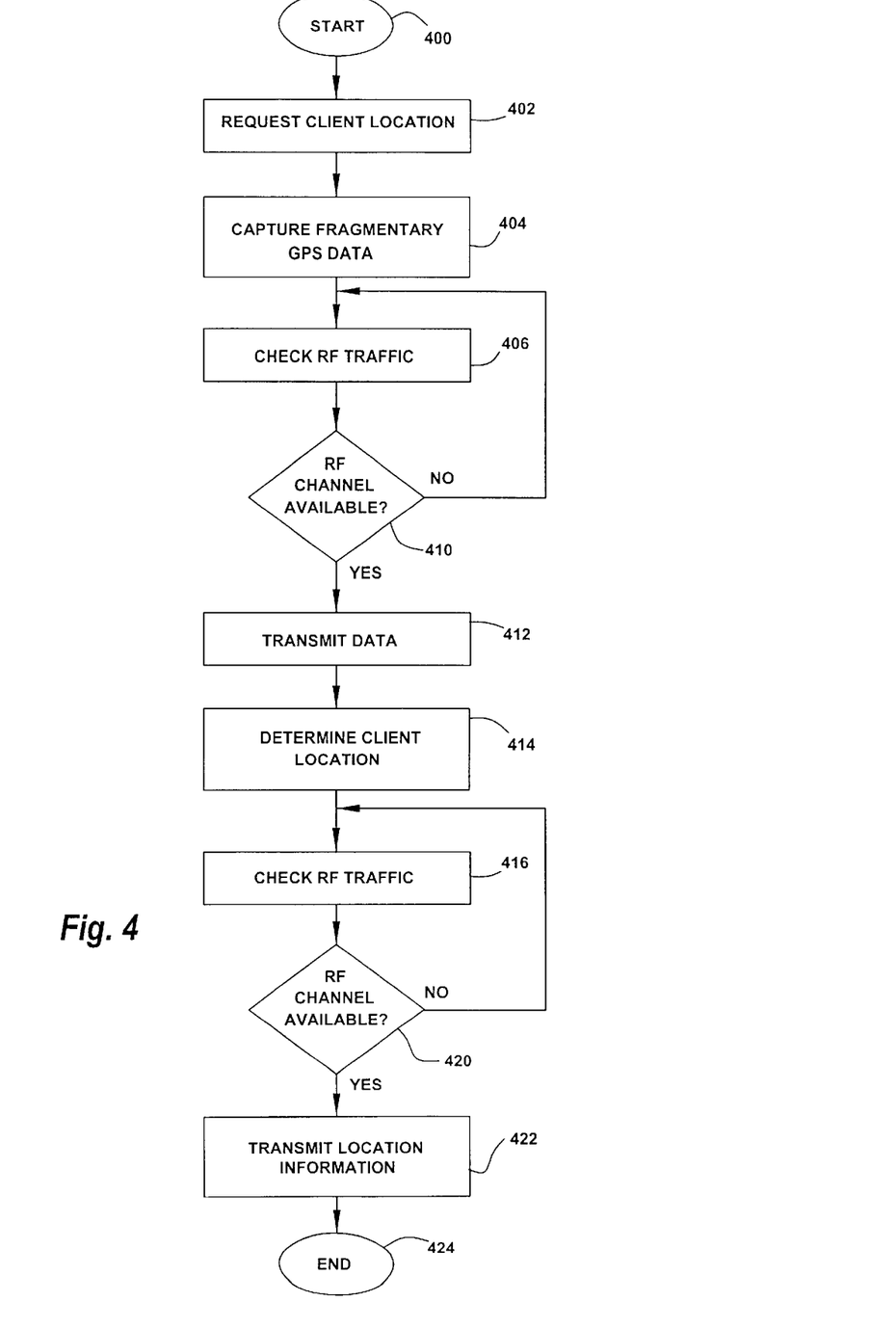
FIG. 4 is a flowchart illustrating the operation of the present invention.

The operation of the system 100 is illustrated in the flowchart of FIG. 4 where at a start 400, at least one client unit 102 (see FIG. 1) and one server unit 120 are available. In step 402, there is a request to determine the location of the client unit 102. In one example embodiment, discussed above, the user of the client unit 102 manually requests the location via the user interface 216 (see FIG. 2). However, those skilled in the art will appreciate that a number of different techniques may be used to request the client location. For example, the client 102 may automatically generate the client location request at predetermined time intervals. In yet another alternative embodiment, the client unit 102 may generate the request for client location periodically unless the user has recently generated a manual request via the user interface 216.

In yet another alternative embodiment, the server unit 120 may request the client location in step 402. In this embodiment, the server unit 120 may transmit a location request via the radio transmission 156 (see FIG. 1). In this embodiment, the client unit 102 may automatically respond to the request transmitted by the server unit 120 or may prompt the user to activate the request for client location via the user interface 216. If the client unit 102 responds automatically, the location of the client unit 102 may be determined in a manner that is transparent to the user.

Regardless of the specific entity requesting the client location in step 402, the client unit 102 responds to the request by capturing fragmentary GPS data in step 404. As previously discussed, fragmentary GPS data simply refers to GPS data that is insufficient or incomplete in some manner such that the client unit 102 cannot determine its own location independently.

In step 406, the client carrier detection module 208 (see FIG. 2) monitors the RF traffic on a selected RF channel. In decision 410, the client unit 102 determines whether the RF channel is available. If the RF channel is not available (i.e., radio traffic is already present on the RF channel), the result of decision 410 is NO. In that event, the client unit 102 returns to step 406 and continues to monitor RF traffic until an RF channel is available. If the RF channel is available, the result of decision 410 is YES. In that event, in step 412, the transmitter enable module 210 enables the transmitter 200 to allow the transmission of the digitized fragmentary GPS data via the two-way radio transmission 156.

In step 414, the server processor 304 uses the transmitted data along with data provided by the server GPS receiver 122 to accurately determine the location of the client unit 102.

Once the location of the client 102 has been accurately determined, the server unit 120 can transmit location information back to the client unit 102 via the radio transmission 156. In step 416, the server carrier detection module 308 (see FIG. 3) checks RF traffic on the selected RF channel. In decision 420, the system determines whether the RF channel is available. If the RF channel is not available (i.e., other radio traffic is already transmitting on the RF channel), then the result of decision 420 is NO. In that event, the server unit 120 returns to step 416 and continues to monitor the RF traffic until the RF channel is available. When the RF channel is available, the result of decision 420 is YES. In that event, in step 422, the server transmitter enable module 310 enables the server transmitter 300 to permit the transmission of location information from the server unit 120 to the client unit 102 via the radio transmission 156. Once the location information has been transmitted, the process ends at 424.

In this manner, the system 100 provides server-assisted techniques for accurately determining the location of the client unit using a radio frequency link between the client unit 102 and the server unit 120.

It will be apparent to one skilled in the art that there are other variations to the scenario described above. The request for the location of the client unit 102 could originate at the client unit 102 or the server unit 120, in which case, the server unit 120 transmits a location request with the unique identifying code attached. The client unit 102 having the corresponding ID code responds by taking the snapshot, and the process would continue as described, except that the location information would be presented at the server user interface 316. If the server unit 120 initiates the location request, it may not be necessary to provide location to the client unit 102. In this example, it is not necessary to perform the processes 416–422 illustrated in FIG. 4.

According to the principles of the invention, and in various embodiments thereof, the device described can be useful in many applications. For example, client units carried by taxis and messengers could be programmed to automatically take a snapshot and transmit the data packets at timed intervals, providing a dispatcher with accurate location information in real time.

Client units carried by police or other emergency personnel could be programmed to take snapshots at periodic intervals and store the data. In the event of an emergency, the user would transmit the most recent snapshot data. This would eliminate the time lag associated with the snapshot procedure, and would also provide a general location in situations in which the unit is completely shadowed from the GPS satellite transmissions, within buildings etc.

It will be obvious to those skilled in the art that there are many other applications for the invention, each of which will require variations on the embodiments described herein, and which are considered to be encompassed within the scope of the invention.

What is claimed is:

1. A server-assisted position detection system, comprising:
   a client global positioning system (GPS) receiver circuit, for receiving a first set of satellite positioning signal data from GPS satellites, the first set of data being insufficient to independently establish the location of the client GPS receiver;
   a client transmitter to transmit the first set of data;
   a client carrier detection module to detect radio traffic on a radio frequency (RF) channel;
   a client transmit-enable module to enable the client transmitter when no radio traffic is detected on the RF channel;
   a server receiver to receive the first set of data from the client transmitter; and
   a server coupled to the server receiver and configured to analyze the satellite data received by the server receiver, the server using the first set of data and additional satellite positioning signal data to generate location information regarding the location of the client GPS receiver.

2. The system of claim 1, further comprising an additional GPS receiver circuit associated with the server to generate the additional satellite positioning signal data.

3. The system of claim 1, further comprising a client identifier module to generate a unique code identifying the client transmitter.

4. The device of claim 1, further comprising a client processor wherein the client carrier detect module and the client transmit enable module comprise a series of program instructions executed by the client processor.

5. The device of claim 1, further comprising a server user interface module, including a display screen and keyboard to display the location information.

6. The device of claim 5 wherein the server user interface module comprises a representation of a local map for indicating the location information.

7. The device of claim 1, further comprising;
   a client receiver to receive the location information;
   a server transmitter to transmit the location information to the client receiver;
   a server carrier detection module for detecting radio traffic on an RF channel; and
   a server transmit-enable module to enable the server transmitter when no radio traffic is detected on the RF channel to thereby transmit the location information to the client receiver.

8. The device of claim 7, further comprising a client user interface, including a display to display the location information.

9. The device of claim 8 wherein the client user interface further comprises a representation of a local map for indicating the location information.

10. The device of claim 7, further comprising a base processor wherein the base carrier detect module and the base transmit enable module comprise a series of program instructions executed by the base processor.

11. A method of server-assisted location detection, comprising:
   requesting a location of a client unit;
   detecting a plurality of satellite global position signals at the client unit in response to the location request;
   capturing segments of the plurality of satellite signals;
   observing a selected radio frequency (RF) channel to detect existing radio traffic on the selected RF channel; and
   in the absence of existing radio traffic, transmitting data packets indicative of the captured satellite signals from the client unit to a server unit on the selected RF channel;
   determining the location of the client unit by analysis of the satellite signal segments;
   presenting the location of the client unit at a user interface.

12. The method of claim 11, further comprising appending identification data to the transmitted data packets, the identification data providing a unique identification of the client unit.

13. The method of claim 11, further comprising:
   observing a selected radio frequency (RF) channel to detect existing radio traffic on the selected RF channel; and in absence of existing radio traffic, transmitting the location information from the server unit to the client unit on the selected RF channel.

14. The method of claim 11 wherein the location request originates at the client unit, the method further comprising transmitting data indicating the location to the client unit via the two-way radio.

15. The method of claim 14 wherein transmitting the location data to the client unit comprises:
  compiling the location data into a location information packet;
  observing a selected radio frequency (RF) channel to detect existing radio traffic on the selected RF channel; and
  in the absence of existing radio traffic, transmitting the location information packet from the server unit to the client unit on the selected RF channel.

16. The method of claim 15, further comprising appending identification data to the location information packet, the identification data providing a unique identification of the client unit.

17. The method of claim 11 wherein detecting the plurality of satellite global position signals at the mobile unit and capturing segments occur in advance of receiving the location request.

18. The method of claim 17 wherein detecting the plurality of satellite global position signals at the mobile unit and capturing segments are performed periodically, and wherein the transmitting data packets to the server following step of receiving a request comprises transmitting the most recent data packets.

19. The method of claim 11 wherein the user interface is a portion of the client unit and presenting the location of the client unit comprises displaying the location on a display.

20. The method of claim 19, further comprising displaying a local map and displaying the location of the client unit on the local map.

21. For use in a server-assisted position detection system, a client unit comprising:
  a client receiver for receiving satellite positioning data;
  a client transmitter to transmit the data on an RF channel to a server for use in determining a location of the client receiver;
  a client detector to detect radio traffic on the RF channel;
  a client transmitter-enabler to allow the client transmitter to transmit the data only when no radio traffic is detected on the RF channel.

22. For use in a server-assisted position detection system, a server unit comprising:
  a server receiver to receive satellite positioning data from a client;
  a server coupled to the server receiver to generate client location information from at least the satellite positioning data;
  a server transmitter to transmit the location information to the client;
  a server detector to detect radio traffic on an RF channel; and
  a server transmit-enabler to enable the server transmitter to transmit the location information only when no radio traffic is detected on the RF channel.

* * * * *